(12) United States Patent
Udupa Sripathi et al.

(10) Patent No.: US 9,408,094 B2
(45) Date of Patent: Aug. 2, 2016

(54) APPARATUS AND METHOD FOR ASSESSING DECODE RELIABILITY OF RADIO TRANSMISSIONS

(71) Applicant: QUALCOMM Incorporated, San Diego, CA (US)

(72) Inventors: Prashant Udupa Sripathi, San Jose, CA (US); Nate Chizgi, Sunnyvale, CA (US); Christopher Cooper Riddle, San Diego, CA (US); Nitin Kasturi, Saratoga, CA (US); Atul Arvind Salvekar, Emeryville, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 13/800,087

(22) Filed: Mar. 13, 2013

(65) Prior Publication Data

US 2014/0078917 A1     Mar. 20, 2014

Related U.S. Application Data

(60) Provisional application No. 61/701,474, filed on Sep. 14, 2012.

(51) Int. Cl.
| | |
|---|---|
| *H04L 1/00* | (2006.01) |
| *H04W 24/08* | (2009.01) |
| *H04L 1/20* | (2006.01) |
| *G10L 19/22* | (2013.01) |
| *G10L 25/60* | (2013.01) |

(52) U.S. Cl.
CPC ............... *H04W 24/08* (2013.01); *G10L 19/22* (2013.01); *H04L 1/0045* (2013.01); *H04L 1/0054* (2013.01); *H04L 1/20* (2013.01); *G10L 25/60* (2013.01)

(58) Field of Classification Search
CPC ... H04L 1/0047; H04L 1/0054; H04L 1/0059; H04L 1/0061; H04L 25/0202; H04L 1/0045; H04L 1/20; H04W 24/08; G10L 19/22
USPC .................. 370/241, 252, 242; 375/225, 341; 714/786
See application file for complete search history.

(56) References Cited

U.S. PATENT DOCUMENTS

| | | | | |
|---|---|---|---|---|
| 5,774,496 | A * | 6/1998 | Butler et al. ................... | 375/225 |
| 6,263,030 | B1 * | 7/2001 | Khayrallah .................... | 375/341 |

(Continued)

FOREIGN PATENT DOCUMENTS

WO     WO2011063568     *  6/2011

*Primary Examiner* — Kwang B Yao
*Assistant Examiner* — Harun Chowdhury
(74) *Attorney, Agent, or Firm* — François A. Pelaez

(57) ABSTRACT

Disclosed are an apparatus and method for assessing decode reliability of voice, data and control channel transmissions. In an aspect, the apparatus and method are configured to receive one or more radio frames or parts of a frame on a downlink channel; demodulate the received one or more frames or parts of the frame; decode the demodulated one or more frames or parts of the frame; compute one or more demodulator-based metrics and one or more decoder-based metrics; combine the one or more demodulator-based metrics and the one or more decoder-based metrics using a reliability function that assesses reliability of the decoded one or more frames or parts of the frame; and accept or reject the decoded one or more frames or parts of the frame based on the assessment of the reliability of the decoded frames or parts of the frame.

31 Claims, 10 Drawing Sheets

(56) References Cited

U.S. PATENT DOCUMENTS

| | | |
|---|---|---|
| 6,567,475 B1 | 5/2003 | Dent |
| 6,848,069 B1 | 1/2005 | Levy et al. |
| 8,223,869 B2 | 7/2012 | Bottero et al. |
| 8,315,339 B2 | 11/2012 | Rosenqvist et al. |
| 2009/0249165 A1 | 10/2009 | Gracie et al. |
| 2010/0118707 A1* | 5/2010 | Im et al. .................. 370/241 |
| 2012/0082197 A1 | 4/2012 | Jonsson et al. |
| 2013/0250785 A1* | 9/2013 | Mujtaba et al. ............ 370/252 |

* cited by examiner

APPARATUS AND METHOD FOR ASSESSING DECODE RELIABILITY OF RADIO TRANSMISSIONS

CLAIM OF PRIORITY UNDER 35 U.S.C. §119

The present Application for Patent claims priority to Provisional Applications No. 61/701,474 entitled "Apparatus and Method for Assessing Decode Reliability of WCDMA Transmissions" and filed on Sep. 14, 2012, and assigned to the assignee hereof and hereby expressly incorporated by reference herein.

BACKGROUND

1. Field

Aspects of the present disclosure relate generally to wireless communication systems, and more particularly, to an apparatus and method for assessing reliability of decoded voice, data and control channel transmissions.

2. Background

Wireless communication networks are widely deployed to provide various communication services such as telephony, video, data, messaging, broadcasts, and so on to user equipment (UE). Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division—Code Division Multiple Access (TD-CDMA), and Time Division—Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. High Speed Downlink Packet Access (HSDPA) is a data service offered on the downlink of WCDMA networks.

Some wireless communication networks, such as WCDMA, provide early voice frame termination functionality by which early decoding on voice transport channels is attempted by the UE receiver, so that the receiver may be transitioned into a low-power state to preserve battery power of the UE if the early decoding of the voice frame is deemed successful. Some of these voice transport channels do not carry Cyclic Redundancy Check (CRC) bits, which are used for error-detection purposes. In the absence of a CRC on early terminated voice frames, there may be no mechanism for the UE receiver to assess reliability of the early decoded frames, which may adversely affect system performance. Accordingly, there is a need for a mechanism for assessment of the reliability of early decoded voice frames. In addition, decode reliability assessment may be also desired in the context of decoding of control channels, such as a Dedicated Control Channel (DCCH) in WCDMA systems.

SUMMARY

The following presents a simplified summary of one or more aspects of systems, methods and computer program products for assessing reliability of decoded voice, data and control channel transmissions. This summary is not an extensive overview of all contemplated aspects of the invention, and is intended to neither identify key or critical elements of the invention nor delineate the scope of any or all aspects thereof. Its sole purpose is to present some concepts of one or more aspects in a simplified form as a prelude to the more detailed description that is presented later.

In one aspect, a method, in a UE, for assessing decode reliability of radio frames includes receiving one or more radio frames or parts of a frame on a downlink channel. The method further includes demodulating the received one or more frames or parts of the frame. The method further includes decoding the demodulated one or more frames or parts of the frame. The method further includes computing one or more demodulator-based metrics and one or more decoder-based metrics. The method further includes combining the one or more demodulator-based metrics and the one or more decoder-based metrics using a reliability function that assesses reliability of the decoded one or more frames or parts of the frame. The method further includes accepting or rejecting the decoded one or more frames or parts of the frame based on the assessment of the reliability of said frames or parts of the frame.

In another aspect, an apparatus for assessing decode reliability of radio frames includes a receiver configured to receive one or more radio frames or parts of a frame on a downlink channel. The apparatus further includes a demodulator configured to demodulate the received one or more frames or parts of the frame. The apparatus further includes a decoder configured to decode the demodulated one or more frames or parts of the frame. The apparatus further includes a demodulator metrics determiner configured to compute one or more demodulator-based metrics. The apparatus further includes a decoder metric determiner configured to compute one or more decoder-based metrics. The apparatus further includes a metrics combiner configured to combine the one or more demodulator-based metrics and the one or more decoder-based metrics using a reliability function that assesses reliability of the decoded one or more frames or parts of the frame. The apparatus further includes the decoder further configured to accept or reject the decoded one or more frames or parts of the frame based on the assessment of the reliability of said frames or parts of the frame.

In another aspect, an apparatus for assessing decode reliability of radio frames includes means for receiving one or more radio frames or parts of a frame on a downlink channel. The apparatus further includes means for demodulating the received one or more frames or parts of the frame. The apparatus further includes means for decoding the demodulated one or more frames or parts of the frame. The apparatus further includes means for computing one or more demodulator-based metrics. The apparatus further includes means for computing one or more decoder-based metrics. The apparatus further includes means for combining the one or more demodulator-based metrics and the one or more decoder-based metrics using a reliability function that assesses reliability of the decoded one or more frames or parts of the frame. The apparatus further includes means for accepting or rejecting the decoded one or more frames or parts of the frame based on the assessment of the reliability of said frames or parts of the frame.

In yet another aspect, a computer program product for wireless communication includes a computer-readable medium having at least one instruction executable by a computer to assess decode reliability of radio frames includes codes for receiving one or more radio frames or parts of a frame on a downlink channel. The computer program product further includes at least one instruction executable by the computer to demodulate the received one or more frames or parts of the frame, and at least one instruction executable by the computer to decode the demodulated one or more frames or parts of the frame. The computer program product further includes at least one instruction executable by the computer to compute one or more demodulator-based metrics, and at least one instruction executable by the computer to compute one or more decoder-based metrics. The computer program product further includes at least one instruction executable by the computer to combine the one or more demodulator-based metrics and the one or more decoder-based metrics using a reliability function that assesses reliability of the decoded one or more frames or parts of the frame. Additionally, the computer program product further includes at least one instruction executable by the computer to accept or reject the decoded one or more frames or parts of the frame based on the assessment of the reliability of said frames or parts of the frame.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
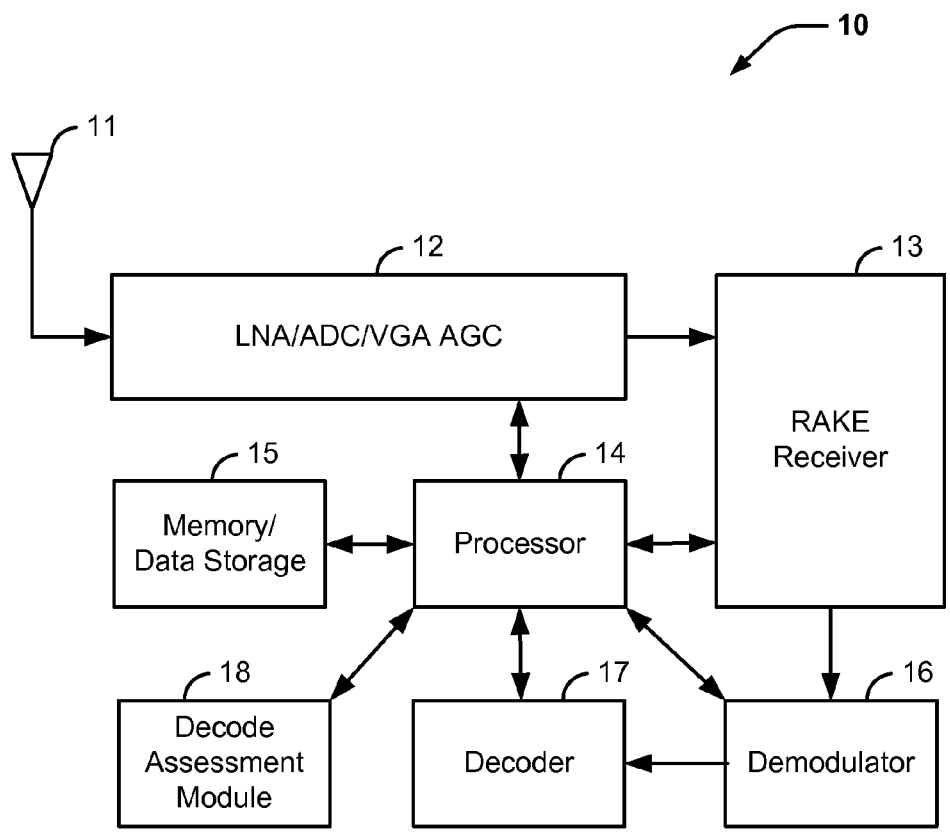
FIG. 1 is a block diagram illustrating one example implementation of a RF receiver.

FIG. 1 illustrates an example configuration of a radio frequency (RF) receiver of a user equipment (UE). The receiver 10 includes a RF antenna 11 that receives RF signals, such as voice, data, and control frames on a downlink channel from a base station (e.g., Node B) and transforms them into electromagnetic signals for processing. The electromagnetic signals are transmitted to amplifier circuit 12, which may include a low noise amplifier (LNA), analog-to-digital converter (ADC), variable gain amplifier (VGA) and automatic gain control (AGC) circuit, which calibrates operating range of the LNA, ADC and VGA. The amplified and digitized signals are then passed to a Rake receiver 13, which is designed to mitigate the effects of the multipath fading. Rake receiver 13 may include a path search for identifying different propagation paths of the received signal, a channel estimator that estimate channel conditions, such as time delay, amplitude and phase for each path component, and a path combiner that combines strongest multipath components of the received signal into one signal. The resulting signal is then demodulated by the demodulator 16, such as a QPSK or QAM demodulator. The demodulated signal is passed to decoder 17, such as Viterbi decoder, which performs decoding of the convolutionally encoded data. The receiver 10 also includes a processor 14, such as a microprocessor or microcontroller, which executes programs for controlling operation of the components of the receiver 10, and memory 15 that stores runtime data and programs executable by the processor 14.

For example, a voice call in the WCDMA system may be processed using an Adaptive Multi Rate (AMR) coding scheme in which speech data is encoded into three classes of data bits often called Classes A, B, and C. These three classes have different levels of importance. The received AMR data is processed as three subflows (e.g., one subflow for each class of data) for a Dedicated Traffic Channel (DTCH) at the Radio Link Control (RLC) layer and sent on three separate voice transport channels (channels 1, 2 and 3, respectively for each class of data) at the Medium Access Control (MAC) layer. Each transport channel is associated with a transmission time interval (TTI) that may span one, two, four, or eight 10-millisecond (ms) frames. Also, each transport channel may have different Quality of Service (QoS) requirements, such as service response time, path loss, signal-to-noise ratio, cross-talk, echo, interrupts, frequency response, loudness levels, and other. In addition, only channel 1, which carriers Class A data, provides CRC bits in each frame, which are used for error correction purposes.

As explained above, some wireless systems, such as WCDMA, provide early voice frame termination functionality by which early decoding of radio frames (e.g., parts of a frame) on voice transport channels is attempted by the receiver 10, so that the receiver 10 may be transitioned into a low-power state to preserve battery power of the UE if the early decode is deemed successful. Some of these voice transport channels do not carry CRC bits, but are, nevertheless, associated with QoS requirements on their residual bit error rate (BER). In the absence of a CRC on early terminated voice frames, the receiver 10 needs another mechanism for assessing reliability of early decodes.

In other aspects, the assessment of decode reliability of control channel signaling in the WCDMA system is also desired. For example, CRC false alarms (i.e., CRC passing when it should not) are a concern in the context of decoding signaling messages on the Dedicated Control Channel (DCCH) or other WCDMA control channels. A misinterpreted signaling message may have an unpredictable impact and may cause call drops. Therefore, additional mechanisms for assessing reliability of the DCCH decodes as an enhancement over using just the CRC is desired.

To that end, in one aspect, the receiver 10 may include a decode assessment module 18 configured to perform reliability assessment of voice, data and control frames. In one aspect, the module 18 may use various soft metrics, such as SNR from the receiver 10, to assess reliability of one or more decoded voice, data or control frames or parts of the frame. In another aspect, the module 18 may use soft and hard metrics, such as symbol error counts from a Viterbi decoder 17, to assess reliability of decoded frames. In another aspect, the module 18 may use a combination of multiple such metrics to generate a binary decision on the reliability of decoding. In another aspect, the module 18 may use a reliability decision function that is independent of the early decode time or which may be tuned to a specific decode time. In yet another aspect, the module 18 may dynamically tune the reliability decision function over time in an adaptive manner to improve reliability of decoded frames or parts of the frames.

Figure 2:
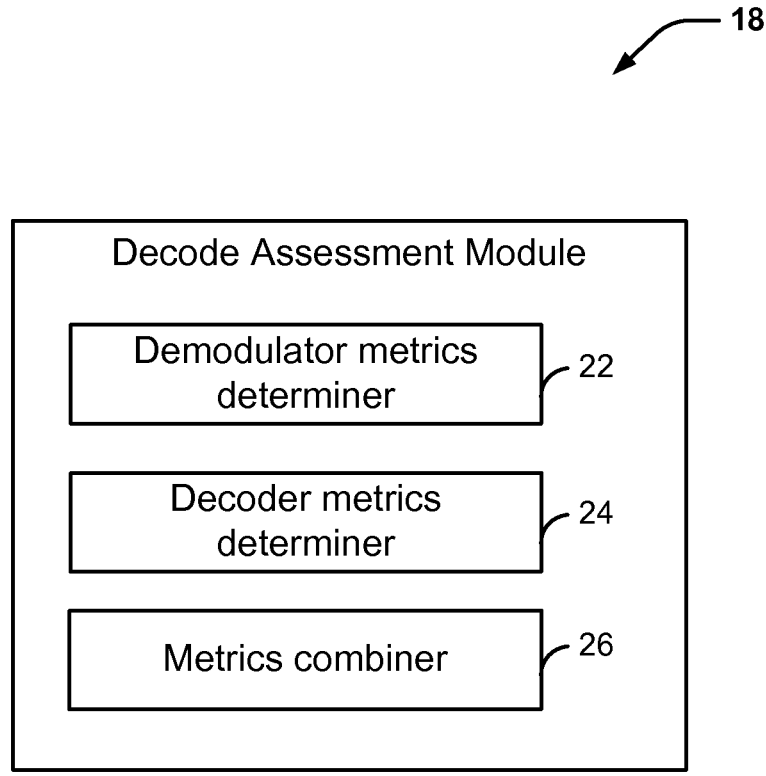
FIG. 2 is a block diagram illustrating one example implementation of a decode assessment module of the RF receiver.

FIG. 2 illustrate one example implementation of the decode assessment module of a RF receiver, such as a receiver 10 of FIG. 1. In one aspect, the decode assessment module 18 may be implemented as a software program stored in memory 15 and executed by the processor 14. The processor 14 may periodically, e.g., every 10 ms, 14 ms or 20 ms, activate the decode assessment module 18 to assess reliability of decoded radio frames or parts of the frames received from a base station. As shown, the decode assessment module 18 may include a demodulator metrics determiner 22, a decoder metrics determiner 24, and a metrics combiner 26.

In one aspect, the demodulator metrics determiner 22 may calculate various front end metrics (also referred as demodulator-based metrics) from the demodulator 16 of the receiver 10, which can be used to assess reliability of the decoded radio frames or parts of the frame. For example, a demodulator-based metric includes a Signal-to-Noise Ratio (SNR) of the Common Pilot Channel (CPICH). In another aspect, a demodulator-based metric may include a SNR of the Dedicated Physical Channel (DPCH) (also known as DPCH Signal-to-Interference-Ratio Estimate or DPCH SIRE or just SIRE). This metric may be based on signal estimations from one or more of DPCCH-DP, DPCCH-TPC, and DPCCH-TFCI and noise estimations based on one or more of CPICH, DPCCH-DP, DPCCH-TPC, and DPCCH-TFCI. In another aspect, a demodulator-based metric may include a DPCH target SNR (also known as DPCH Signal-to-Interference-Ratio Target or DPCH SIRT or just SIRT). In another aspect, a demodulator-based metric may include a Dedicated Physical Control Channel (DPCCH) energy, which can be computed for each DPCCH sub-field: DP, TPC, and TFCI. In yet another aspect, a demodulator-based metric may include a Dedicated Physical Data Channel (DPDCH) energy, which can be computed for each transport channel on the DPDCH including, for example, the DCCH channel that carries signaling messages. Other types of demodulator-based metrics may be used in other aspects.

In another aspect, the decoder metrics determiner 24 of the decode assessment module 18 may calculate various decoder-based metrics from the decoder 17 of the receiver 10, which can be used to assess reliability of the decoded radio frames or parts of the frame. Consider, for instance, a binary data sequence $\{d_i\}$ that is encoded into the antipodal sequence $\{c_i\}$. In the simple case of a channel with additive noise, the input to the decoder 17 is a sequence $\{s_i = c_i + n_i\}$ and the output is $\{\hat{d}_i\}$. The decoded data sequence $\{\hat{d}_i\}$ may then be re-encoded into the antipodal sequence $\{\hat{c}_i\}$. The following decoder-based metrics may be generated based on the above decoded data: In one aspect, the decoder-based metric may include a decoder energy metric (EM), which can be computed as a correlation between the input to the decoder and the re-encoded output in the following manner $EM = \Sigma s_i \hat{c}_i$. In another aspect, the decoder-based metric may include a symbol error count (SER) metric may be computed as the number of sign mismatches between the decoder input and the re-encoded output in the following manner $SER = \Sigma \mathrm{sign}(s_i \hat{c}_i)$. In yet another aspect, the decoder-based metric may include a Yamamoto quality bit (YQBIT), which can be set to zero if there exists a code-word $\{c^k_i\}$ whose correlation with the decoder input is within a threshold of the energy metric (EM). The threshold $Y_T$ is typically programmable. The Yamamoto quality bit metric may be determined using the following expression: $YQBIT = 0 \Leftrightarrow \Sigma s_i \hat{c}_i - \Sigma s_i c^k_i < Y_T$. In yet another aspect, the decoder-based metric may include one or more Viterbi Decoder (VD) Path metrics, such as a minimum (Mmin), maximum (Mmax), and zero-state (M0) path metrics at the point of expected trellis termination. Other types of decoder-based metrics may be used in other aspects.

In another aspect, the metrics combiner 26 of decode assessment module 18 combines one or more demodulator-based metrics and decoder-based metrics using a reliability function in order to assess reliability of an decoded radio frames or parts of the frame. The combination process will be illustrated based on the example of an AMR 12.k voice call in the WCDMA system. Particularly, an AMR 12.2 k call uses three transport channels for the voice radio bearer: Transport Channel A with a 12 bit CRC; and Transport Channels B and C that do not have a CRC. Combiner 26 may use the following reliability function to assess reliability of the early decode voice frames:

CRC of A has passed
AND
SIRE>SIRT+K1 dB OR YQBIT of B is 1 OR SER of B<K2
AND
SIRE>SIRT+K3 dB OR YQBIT of C is 1 OR SER of C<K4

The parameters of this reliability function may be optimized offline in a simulation environment or may be adaptively updated in the course of the voice call. Example values of the parameters used in the above reliability function may be K1=3 dB, K2=12, K3=3 dB, K4=8. Note that neither the metrics nor the reliability functions are uniquely determined and other variations of the above function can be used. It should be also noted that, in one aspect, the decode assessment module 18 may use a reliability function that is independent of the early decode time or may be tuned to the specific decode time. In another aspect, the early decode assessment module 18 may dynamically tune the reliability function over time in an adaptive manner to further improve assessment of reliability of early decoded voice channels.

Figure 3:
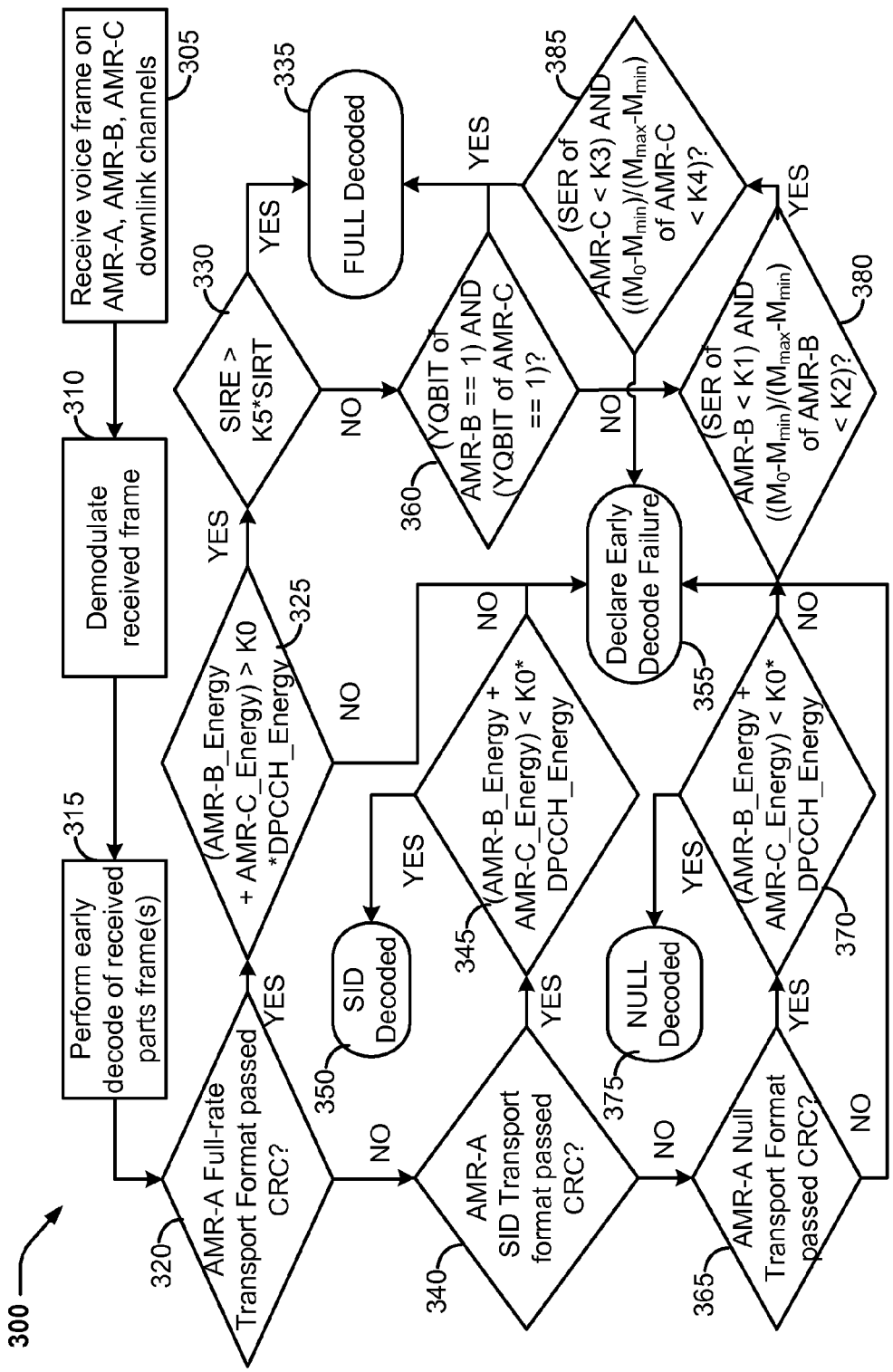
FIG. 3 is a flow diagram illustrating an example methodology for assessing reliability of early decoded voice channel frames according to one aspect.

FIG. 3 illustrates an example implementation of the methodology for assessing reliability of early decoded voice frames according to the principles disclosed herein. In one aspect, the method 300 may be implemented in the decode assessment module 18 (FIGS. 1 and 2) of the receiver 10 of FIG. 1. At step 305, the method 300 includes receiving one or more voice frames or parts of voice frames on AMR-A, AMR-B, AMR-C downlink channels. At step 310, the method 300 includes demodulating the received frames. At step 315, the method 300 includes performing early decode of the received parts of the frames. At step 320, the method 300 includes checking if Channel A full-rate transport format passed the CRC. If CRC is passed, at step 325, the method 300 includes checking if energy of Channels B and C is above a demodulator-base metric: (AMR-B_Energy+AMR-C_Energy)>K0*DPCCH_Energy. If, at step 325, the answer is No, then, at step 355, the method 300 includes declaring early decode failure in which case the decoder 17 of the receiver 10 may continue decoding received voice frames. If, at step 325, the answer is Yes, then the method 300 checks, at step 330, if SIRE is greater than demodulator-based metric K5*SIR_TARGET (SIRT). If, at step 330, the answer is Yes, then early decode of the voice frame on Channel A is considered successful, at step 335. If, at step 330, the answer is No, then, at step 360, the method 300 includes checking decoder-based metrics: (YQBIT of AMR-B=1) AND (YQBIT of AMR-C=1). If, at step 360, the answer is Yes, then early decode of the voice frame on Channel A is considered successful, at step 335. If, at step 360, the answer is No, then the method 300 includes checking, at step 380, another set of decoder-based metrics for Channel B: (SER of AMR-B<K1) AND (($M_0-M_{min}$)/($M_{max}-M_{min}$) of AMR-B<K2). If, at step 380, the answer is Yes, then the method 300 includes checking, at step 385, another set of decoder-based metrics for Channel C: (SER of AMR-C<K3) AND (($M_0-M_{min}$)/($M_{max}-M_{min}$) of AMR-C<K4). If, at step 385, the answer is Yes, then early decode of all AMR channels is considered successful, at step 335. If, at step 385, the answer is No, then, at step 355, the method 300 includes declaring early decode failure in which case the decoder 17 of the receiver 10 may continue decoding received voice frames. If, at step 320, the Channel A full-rate transport format did not pass the CRC, then, at step 340, the method 300 includes checking if AMR-A Silence Indicator (SID) Transport format passed CRC. If, SID CRC is passed, then, at step 345, the method 300 includes checking if energy of Channels B and C is below a demodulator-base metric: (AMR-B_Energy+AMR-C_Energy)<K0*DPCCH_Energy. If, at step 345, the answer is Yes, then SID is successfully decoded at step 350; otherwise, at step 355, the method 300 includes declaring early decode failure in which case the decoder 17 of the receiver 10 may continue decoding received voice frames. If, at step 340, the SID CRC failed, then, at step 365, the method 300 further includes checking if AMR-A Null Transport format passed the CRC. If the Null CRC is passed, then, at step 370, the method 300 includes checking if energy of Channels B and C is below a demodulator-base metric: (AMR-B_Energy+AMR-C_Energy)<K0*DPCCH_Energy. If, at step 370, the answer is Yes, then NULL is successfully decoded at step 375; otherwise, at step 355, the method 300 includes declaring early decode failure in which case the decoder 17 of the receiver 10 may continue decoding received voice frames.

Figure 4:
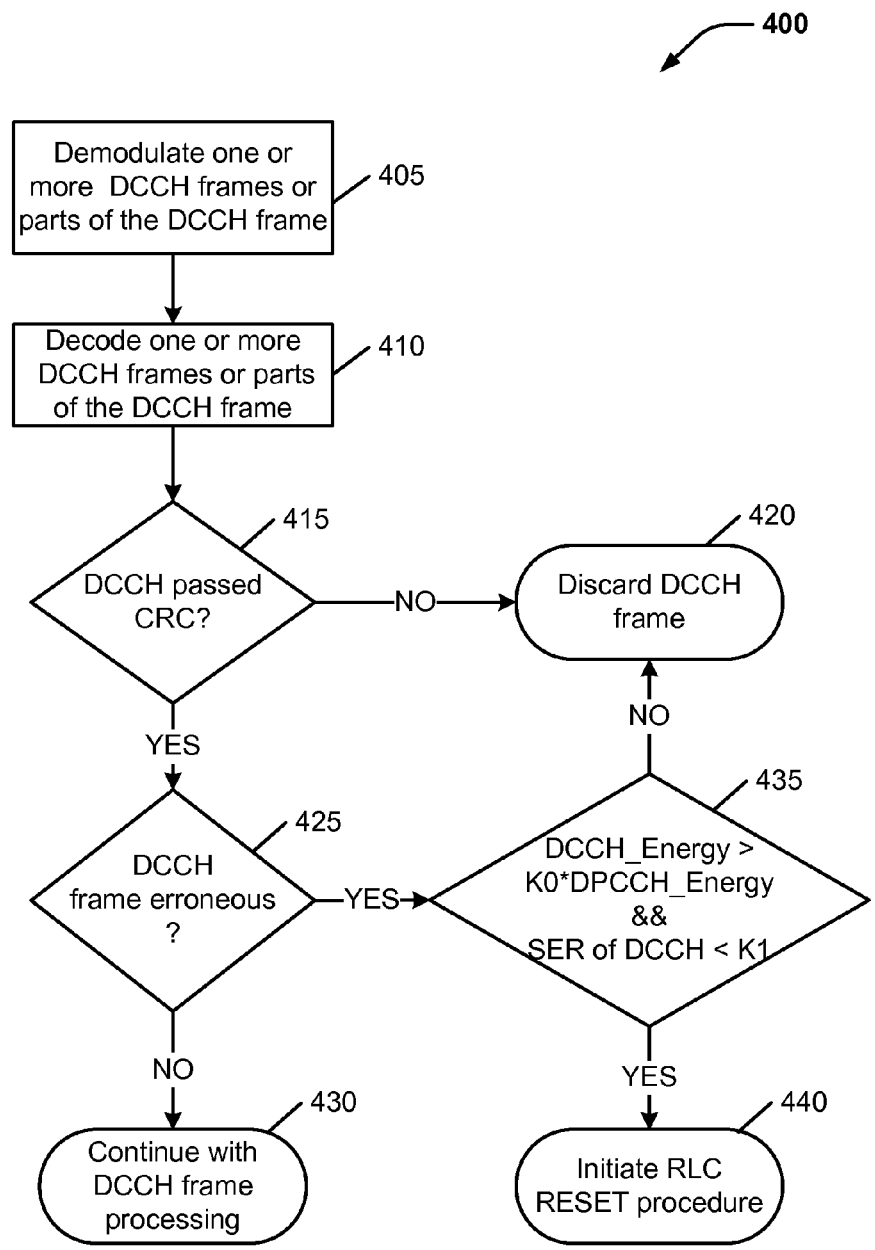
FIG. 4 is a flow diagram illustrating an example methodology for assessing reliability of decoded control channel frames according to another aspect.

FIG. 4 illustrates an example implementation of the methodology for assessing reliability of decoded control channel DCCH frames according to the principles disclosed herein. In one aspect, the method 400 may be implemented in the decode assessment module 18 of the receiver 10 of FIGS. 1 and 2. At step 405, the method 400 includes demodulating one or more DCCH frames or parts of the DCCH frame. At step 410, the method 400 includes decoding one or more DCCH frames or parts of the DCCH frame. At step 415, the method 400 includes checking if DCCH frame passed the CRC. If CRC did not pass, then at step 420, the method 400 includes discarding the DCCH frame. If CRC passed, then, at step 425, the method 400 includes checking if the DCCH frame is indicated to be erroneous by the Radio Link Control (RLC) layer. If no RLC errors, then at step 430, the method 400 includes continue processing the DCCH frame. If, at step 425, the RLC layer found errors in the DCCH frame, then, at step 435, the method 400 includes computing demodulator-based metric DCCH_Energy and decoder-based metric SER of DCCH, and combining these metrics using the following reliability function: DCCH_Energy>K0*DPCCH_Energy && SER of DCCH<K1. If the reliability function is passed, then, at step 440, the method 400 includes initiating RLC Reset procedure. If the reliability function is not passed, then, at step 420, the method 400 includes discarding the DCCH frame.

Figure 5:
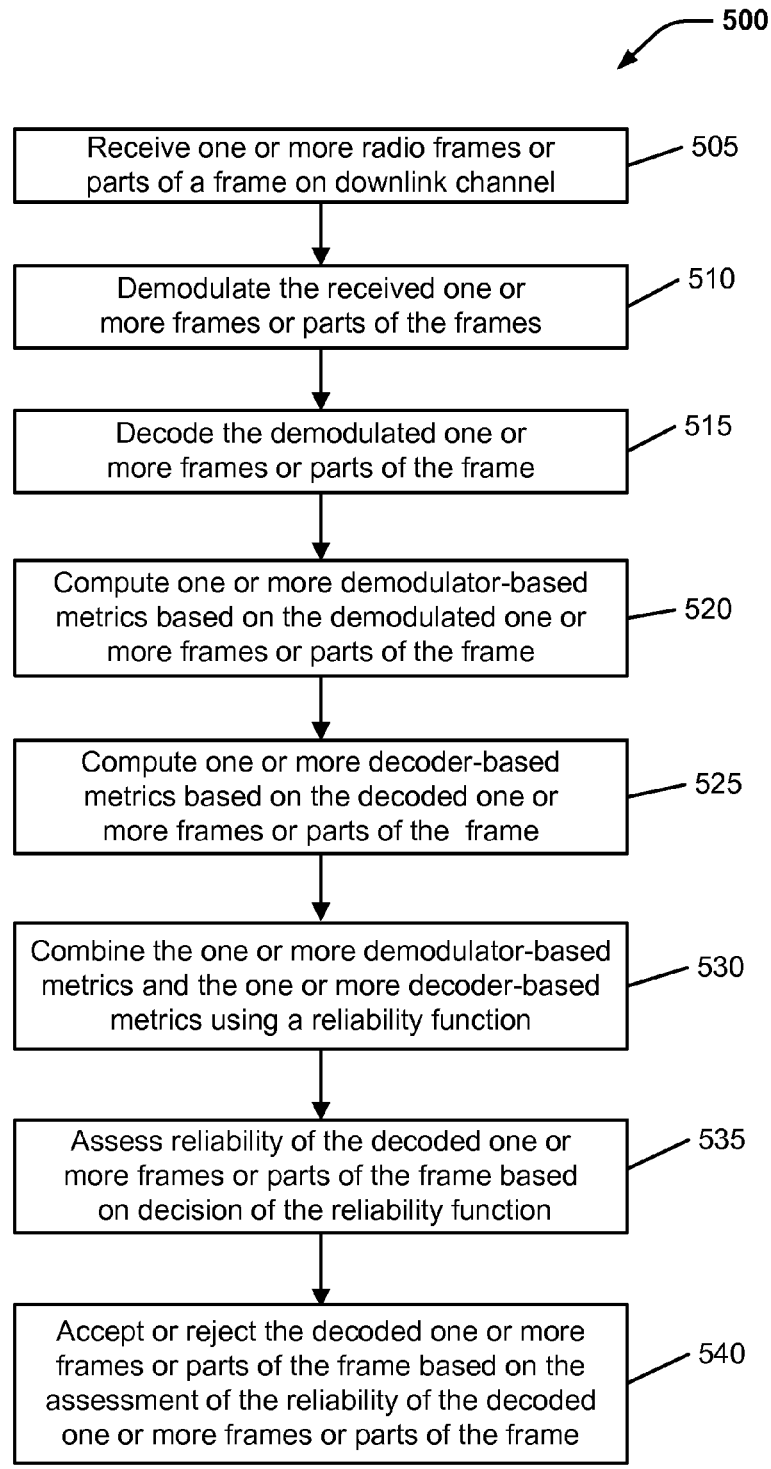
FIG. 5 is a flow diagram illustrating an example methodology for assessing reliability of decoded frames or parts of the frame according to one aspect.

FIG. 5 is an example methodology for assessing reliability of decoded frames by the RF receiver, such as receiver 10 of FIG. 1 that includes a decode assessment module 18 of FIGS. 1 and 2. At step 505, the method 500 includes receiving one or more radio frames or parts of a frame on a downlink channel form a base station. For example, in one aspect, the RF receiver 10 includes a RF antenna 11 and amplifier circuitry 12 for receiving RF signals containing voice, data and control frames. At step 510, the method 500 includes demodulating one or more radio frames of parts of the frame. In one aspect, the receiver 10 includes a demodulator 16 for demodulating voice, data and control frames or parts of the frame. At step 515, the method 500 includes decoding the demodulated one or more frames or parts of the frame. In one aspect, the receiver 10 includes a decoder 17 for decoding demodulated frames or parts of the frame. At step 520, the method 500 includes computing one or more demodulator-based metrics. In one aspect, the receiver 10 includes a decode assessment module 18, which in turn includes a demodulator metric determiner 22 (FIG. 2) for computing one or more demodulator-based metrics, such as a SIRE. At step 525, the method 500 includes computing one or more decoder-based metrics. In one aspect, the receiver 10 includes a decode assessment module 18, which in turn includes a decoder metric determiner 24 (FIG. 2) for computing one or more decoder-based metrics, such as EM, SER, YQBIT. At step 530, the method 500 includes combining one or more demodulator metrics and one or more decoder metrics using a reliability function. In one aspect, the receiver 10 includes an early decode assessment module 18, which in turn includes a metric combiner 26 (FIG. 2) for combining one or more demodulator metrics and one or more decoder metrics using a reliability function. At step 535, the method 500 includes assessing reliability of the early decoded voice frames based on the decision of the reliability function. In one aspect, the early decode assessment module 18 of receiver 10 assesses reliability of the decoded frames based on the decision of the reliability function. At step 540, the method 500 includes accepting or rejecting the one or more decoded frames based on the assessment of reliability of the decoded frames. In one aspect, if the early decode assessment module 18 of the receiver 10 determines that the early decode attempt was successful, it may instruct processor 14 to accept the early decoded frames and terminate reception of voice data frames to conserve battery power of the UE. However, if the early decode assessment module 18 determines that the early decode attempt was unsuccessful, it may instruct processor 14 to reject the early decoded frames and continue reception of voice data frames and retry decoding at a later time, or request retransmission of damaged voice frames from the base station.

Figure 6:
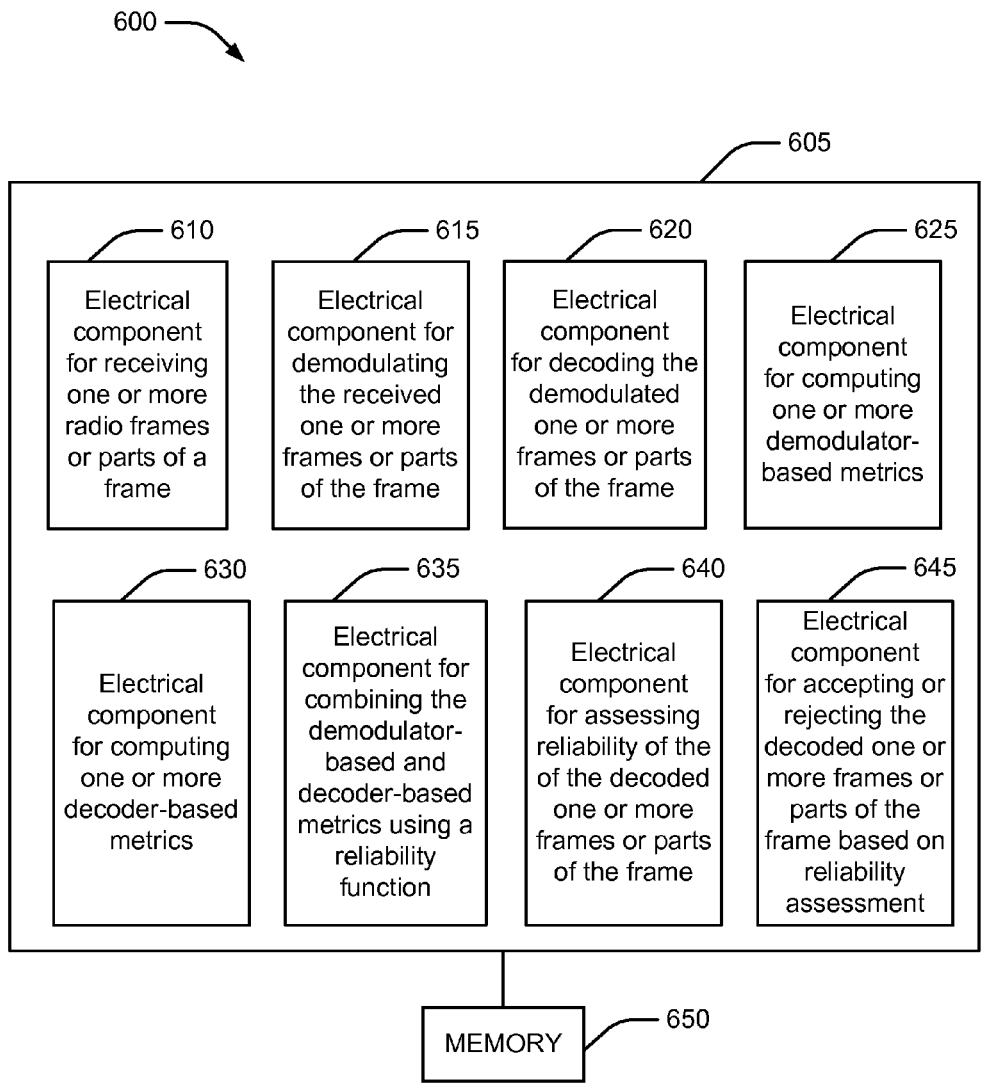
FIG. 6 is a block diagram of an example electrical system for assessing reliability of decoded frames by the RF receiver.

FIG. 6 illustrates an example system 600 for assessing reliability of decoded frames by the RF receiver, such as receiver 10 of FIG. 1 that includes a decode assessment module 18 of FIGS. 1 and 2. It is to be appreciated that system 600 is represented as including functional blocks, which can be functional blocks that represent functions of a RF receiver, such as receiver 10 of FIG. 1, and/or decode assessment module 18 of FIGS. 1 and 2, implemented by a processor, software, or combination thereof (e.g., firmware). System 600 includes a logical grouping 605 of electrical components that can act in conjunction. For instance, logical grouping 605 can include an electrical component 610 for receiving a voice, data or control frame. Moreover, logical grouping 605 can include an electrical component 615 for demodulating one or more frames or parts of the frame. Moreover, logical grouping 605 can include an electrical component 620 for decoding of one or more demodulated frames or parts of the frame. Moreover, logical grouping 605 can include an electrical component 625 for computing one or more demodulator-based metrics. Moreover, logical grouping 605 can include an electrical component 630 for computing one or more decoder-based metrics. Moreover, logical grouping 605 can include an electrical component 635 for combining demodulator metrics and decoder metrics using a reliability function. Moreover, logical grouping 605 can include an electrical component 640 for assessing reliability of the decoded frames based on the reliability function. Moreover, logical grouping 605 can include an electrical component 645 for accepting or rejecting the early decoded frames based on assessment of their reliability. Additionally, system 600 can include a memory 650 that retains instructions for executing functions associated with the electrical components 610-645, stores data used or obtained by the electrical components 610-645, etc. While shown as being external to memory 650, it is to be understood that one or more of the electrical components 610-645 can exist within memory 650. In one example, electrical components 610-645 can comprise at least one processor, or each electrical component 610-645 can be a corresponding module of at least one processor. Moreover, in an additional or alternative example, electrical components 610-645 can be a computer program product including a computer readable medium, where each of the electrical components 610-645 can be corresponding code.

Figure 7:
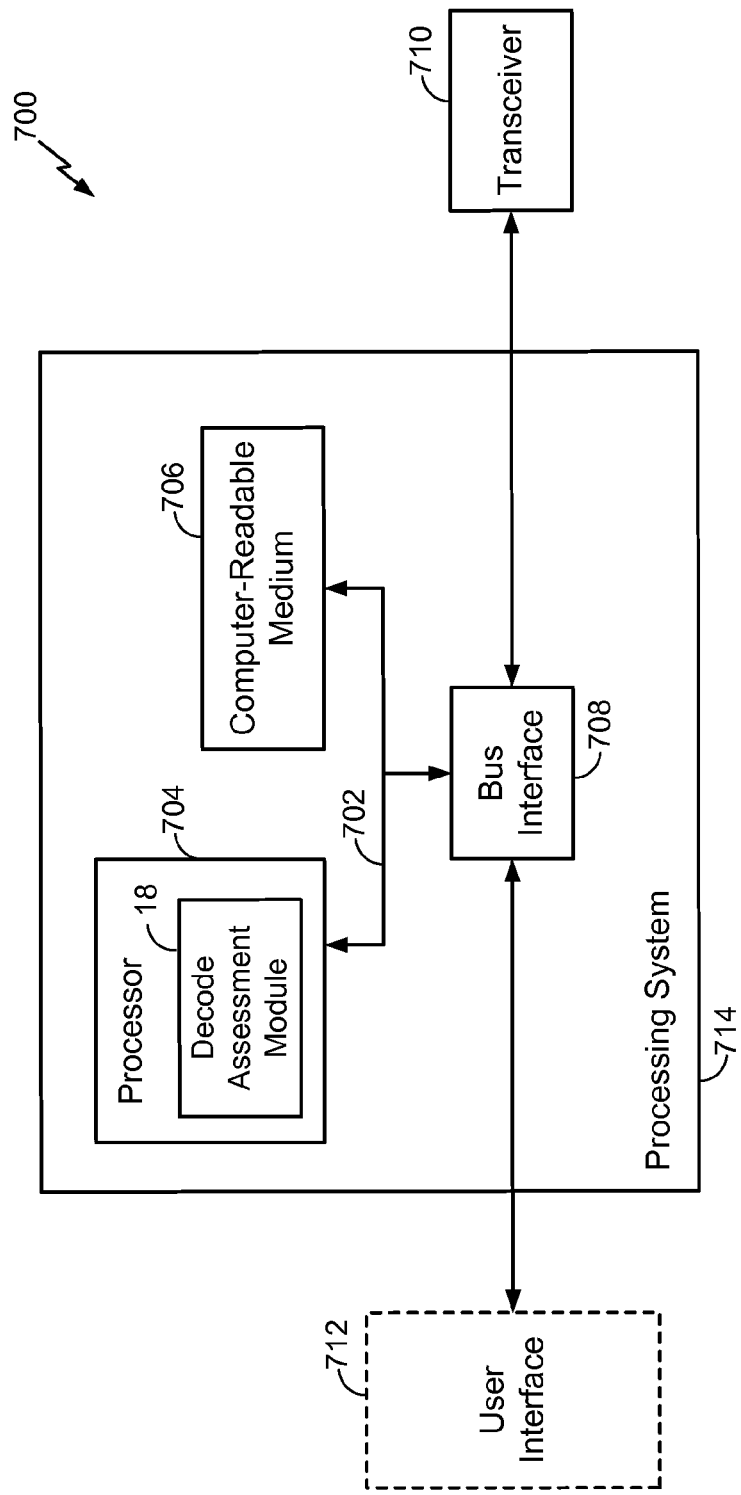
FIG. 7 is a block diagram illustrating an example of a hardware implementation for an apparatus employing a processing system.

FIG. 7 is a block diagram illustrating an example of a hardware implementation for an apparatus 700, such as a UE, employing a processing system 714, such as a RF receiver 10 of FIG. 1 that includes a decode assessment module 18 of FIGS. 1 and 2, which is configured to perform the assessment of the reliability of decoded frames according to various aspects disclosed herein. In this example, the processing system 714 may be implemented with a bus architecture, represented generally by the bus 702. The bus 702 may include any number of interconnecting buses and bridges depending on the specific application of the processing system 714 and the overall design constraints. The bus 702 links together various circuits including one or more processors, represented generally by the processor 704, and computer-readable media, represented generally by the computer-readable medium 706. The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a means for communicating with various other apparatus over a transmission medium. Depending upon the nature of the apparatus, a user interface 712 (e.g., keypad, display, speaker, microphone, joystick) may also be provided.

The processor 704 is responsible for managing the bus 702 and general processing, including the execution of software stored on the computer-readable medium 706. The software, when executed by the processor 104, causes the processing system 714 to perform the various functions described infra for any particular apparatus. In one aspect, the processor 704 includes a decode assessment module 18 that performs assessment of the reliability of decoded voice, data and control frames. The computer-readable medium 706 may also be used for storing data that is manipulated by the processor 704 when executing software, such as the module 18.

Figure 8:
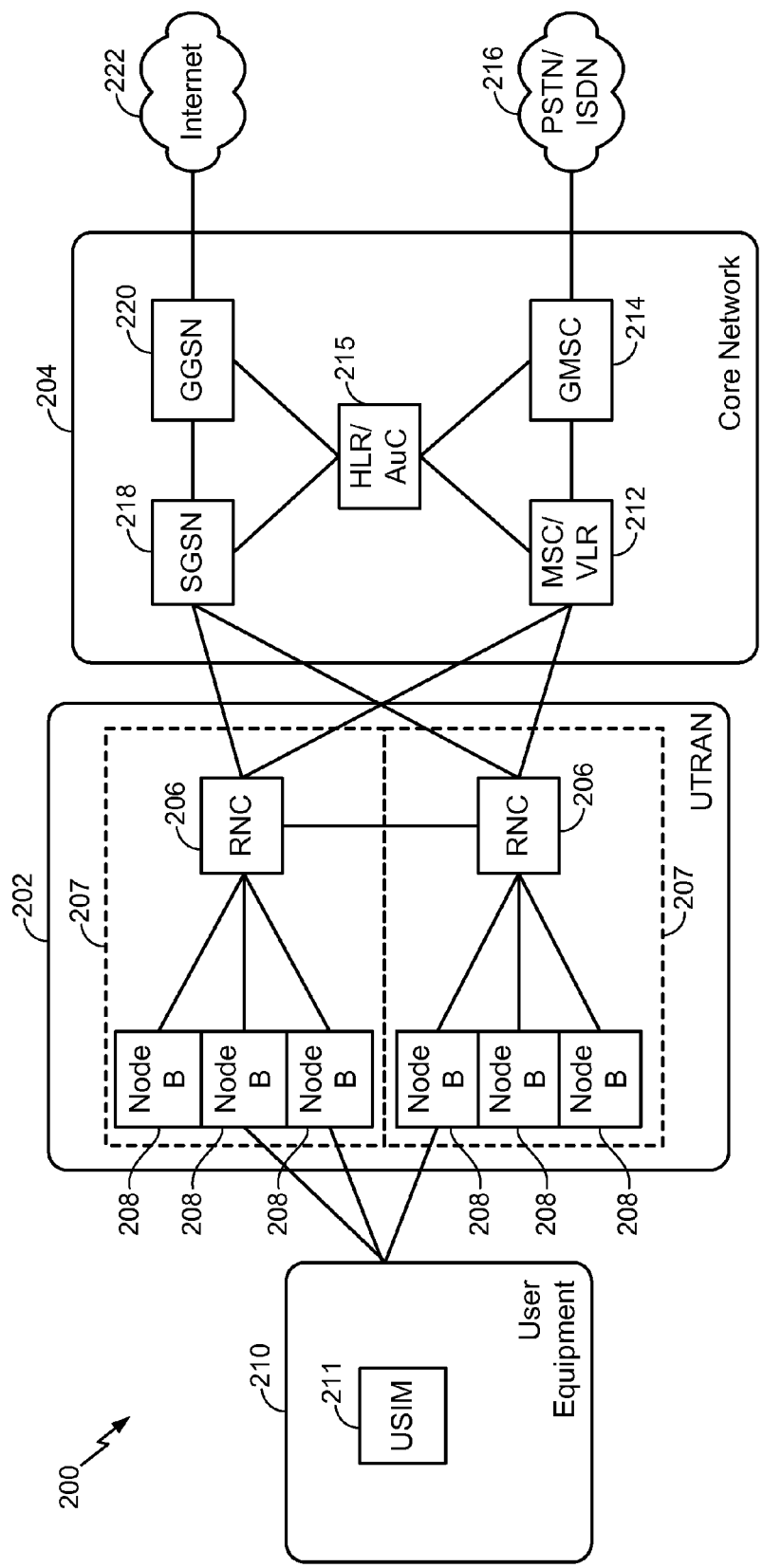
FIG. 8 is a block diagram conceptually illustrating an example of a telecommunications system.

The systems and methods for performing the assessment of the reliability of early decoded frames according to various aspects presented throughout this disclosure may be implemented across a broad variety of telecommunication systems, network architectures, and communication standards. By way of example and without limitation, the aspects of the present disclosure illustrated in FIG. 8 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In one aspect, the UE 210 includes a RF receiver 10 of FIG. 1, which includes decode assessment module 18 of FIGS. 1 and 2. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of UEs 210. Examples of a UE 210 include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The UE 210 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 9:
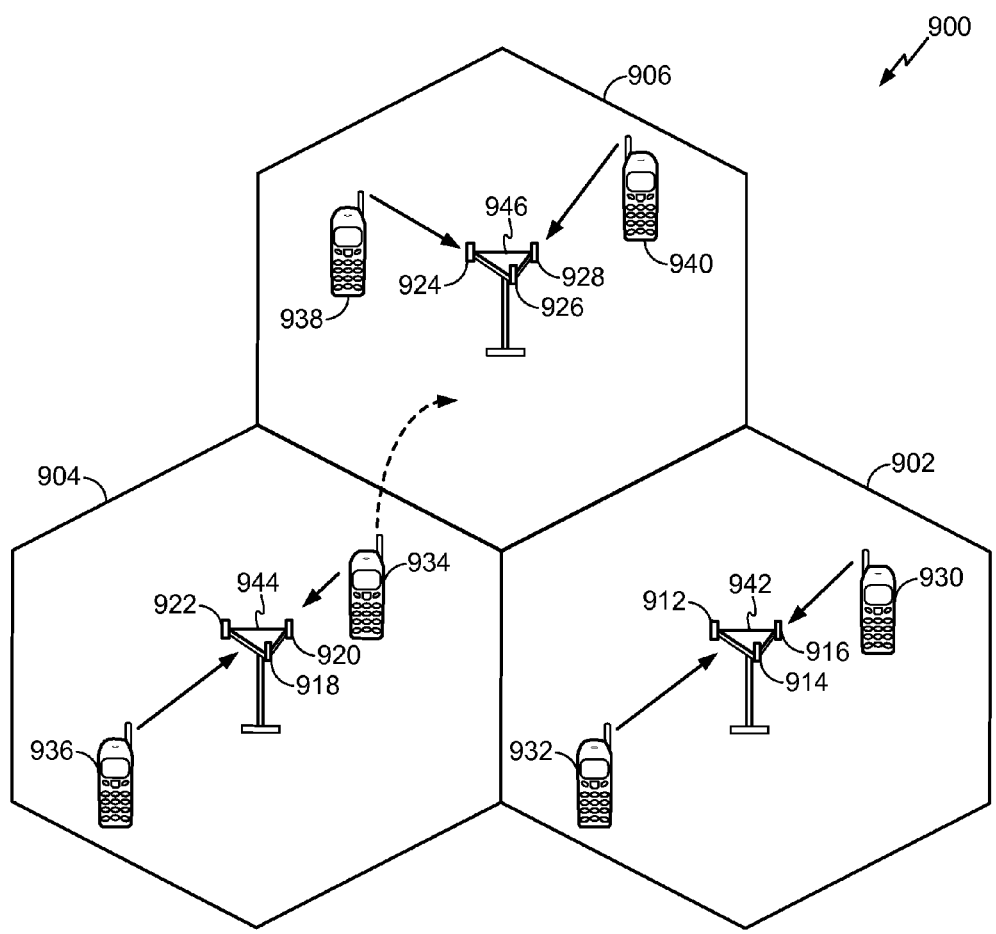
FIG. 9 is a conceptual diagram illustrating an example of an access network.

FIG. 9 illustrates an access network 900 in a UTRAN architecture in which various aspects of systems and methods for performing the assessment of the reliability of early decoded frames can be implemented. In particular, network 900 may include one or more UEs having RF receiver 10 of FIG. 1 and/or decode assessment module 18 of FIGS. 1 and 2. The multiple access wireless communication system includes multiple cellular regions (cells), including cells 902, 904, and 906, each of which may include one or more sectors. The multiple sectors can be formed by groups of antennas with each antenna responsible for communication with UEs in a portion of the cell. For example, in cell 902, antenna groups 912, 914, and 916 may each correspond to a different sector. In cell 304, antenna groups 918, 920, and 922 each correspond to a different sector. In cell 906, antenna groups 924, 926, and 928 each correspond to a different sector. The cells 902, 904 and 906 may include several wireless communication devices, e.g., UEs, which may be in communication with one or more sectors of each cell 902, 904 or 306. For example, UEs 930 and 932 may be in communication with Node B 942, UEs 934 and 936 may be in communication with Node B 944, and UEs 938 and 940 can be in communication with Node B 946. Here, each Node B 942, 944, 946 is configured to provide an access point to a CN 204 (see FIG. 8) for all the UEs 930, 932, 934, 936, 938, 940 in the respective cells 902, 904, and 906. In one aspect, the UEs 930, 932, 934, 936, 938, 940 may include RF receiver 10 of FIG. 1, which include decode assessment module 18 of FIGS. 1 and 2.

As the UE 934 moves from the illustrated location in cell 904 into cell 906, a serving cell change (SCC) or handover may occur in which communication with the UE 934 transitions from the cell 904, which may be referred to as the source cell, to cell 906, which may be referred to as the target cell. Management of the handover procedure may take place at the UE 934, at the Node Bs corresponding to the respective cells, at a RNC 206 (see FIG. 8), or at another suitable node in the wireless network. For example, during a call with the source cell 904, or at any other time, the UE 934 may monitor various parameters of the source cell 904 as well as various parameters of neighboring cells such as cells 906 and 902. Further, depending on the quality of these parameters, the UE 934 may maintain communication with one or more of the neighboring cells. During this time, the UE 934 may maintain an Active Set, that is, a list of cells that the UE 934 is simultaneously connected to (i.e., the UTRA cells that are currently assigning a downlink dedicated physical channel DPCH or fractional downlink dedicated physical channel F-DPCH to the UE 934 may constitute the Active Set).

The modulation and multiple access scheme employed by the access network 900 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 10:
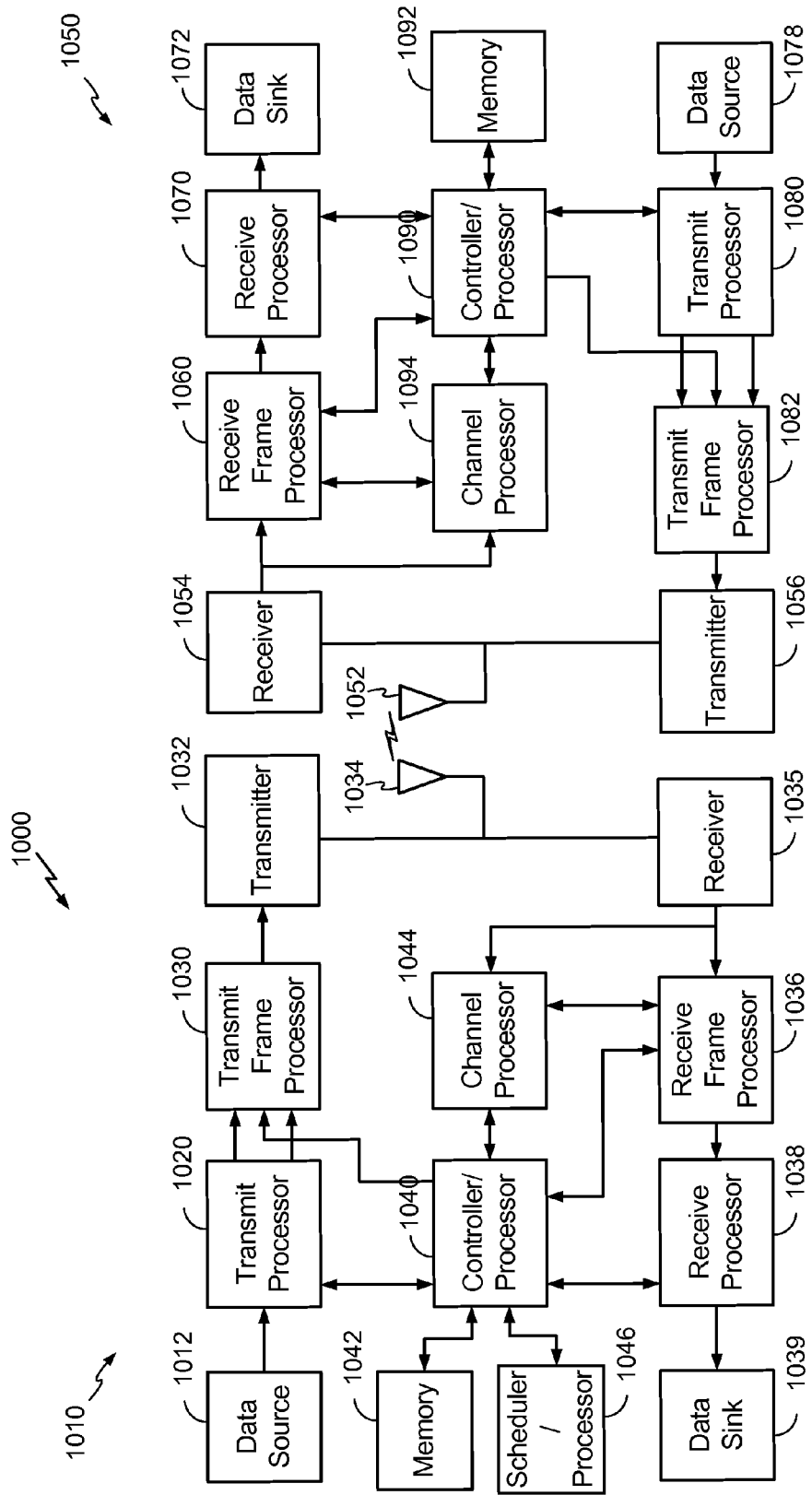
FIG. 10 is a block diagram conceptually illustrating an example of a Node B in communication with a UE in a telecommunications system.

FIG. 10 is a block diagram of a Node B 1010 in communication with a UE 1050, where the Node B 510 may be the Node B 208 in FIG. 8. In one aspect, the UE 1050 includes a RF receiver 10 of FIG. 1, which in turn includes decode assessment module 18 of FIGS. 1 and 2, which is configured to perform the assessment of the reliability of early decoded frames according to various aspects disclosed herein. In the downlink communication, a transmit processor 1020 may receive data from a data source 1012 and control signals from a controller/processor 1040. The transmit processor 1020 provides various signal processing functions for the data and control signals, as well as reference signals (e.g., pilot signals). For example, the transmit processor 1020 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1044 may be used by a controller/processor 1040 to determine the coding, modulation, spreading, and/or scrambling schemes for the transmit processor 1020. These channel estimates may be derived from a reference signal transmitted by the UE 1050 or from feedback from the UE 1050. The symbols generated by the transmit processor 1020 are provided to a transmit frame processor 1030 to create a frame structure. The transmit frame processor 1030 creates this frame structure by multiplexing the symbols with information from the controller/processor 1040, resulting in a series of frames. The frames are then provided to a transmitter 1032, which provides various signal conditioning functions including amplifying, filtering, and modulating the frames onto a carrier for downlink transmission over the wireless medium through antenna 1034. The antenna 1034 may include one or more antennas, for example, including beam steering bidirectional adaptive antenna arrays or other similar beam technologies.

At the UE 1050, a receiver 1054 receives the downlink transmission through an antenna 1052 and processes the transmission to recover the information modulated onto the carrier. The information recovered by the receiver 1054 is provided to a receive frame processor 1060, which parses each frame, and provides information from the frames to a channel processor 1094 and the data, control, and reference signals to a receive processor 1070. The receive processor 1070 then performs the inverse of the processing performed by the transmit processor 1020 in the Node B 1010. More specifically, the receive processor 1070 descrambles and despreads the symbols, and then determines the most likely signal constellation points transmitted by the Node B 1010 based on the modulation scheme. These soft decisions may be based on channel estimates computed by the channel processor 1094. The soft decisions are then decoded and deinterleaved to recover the data, control, and reference signals. The CRC codes are then checked to determine whether the frames were successfully decoded. The data carried by the successfully decoded frames will then be provided to a data sink 1072, which represents applications running in the UE 1050 and/or various user interfaces (e.g., display). Control signals carried by successfully decoded frames will be provided to a controller/processor 1090. When frames are unsuccessfully decoded by the receiver processor 1070, the controller/processor 1090 may also use an acknowledgement (ACK) and/or negative acknowledgement (NACK) protocol to support retransmission requests for those frames.

In the uplink, data from a data source 1078 and control signals from the controller/processor 1090 are provided to a transmit processor 1080. The data source 1078 may represent applications running in the UE 1050 and various user interfaces (e.g., keyboard). Similar to the functionality described in connection with the downlink transmission by the Node B 1010, the transmit processor 1080 provides various signal processing functions including CRC codes, coding and interleaving to facilitate FEC, mapping to signal constellations, spreading with OVSFs, and scrambling to produce a series of symbols. Channel estimates, derived by the channel processor 1094 from a reference signal transmitted by the Node B 1010 or from feedback contained in the midamble transmitted by the Node B 1010, may be used to select the appropriate coding, modulation, spreading, and/or scrambling schemes. The symbols produced by the transmit processor 1080 will be provided to a transmit frame processor 1082 to create a frame structure. The transmit frame processor 1082 creates this frame structure by multiplexing the symbols with information from the controller/processor 1090, resulting in a series of frames. The frames are then provided to a transmitter 1056, which provides various signal conditioning functions including amplification, filtering, and modulating the frames onto a carrier for uplink transmission over the wireless medium through the antenna 1052.

The uplink transmission is processed at the Node B 1010 in a manner similar to that described in connection with the receiver function at the UE 1050. A receiver 1035 receives the uplink transmission through the antenna 1034 and processes the transmission to recover the information modulated onto the carrier. The information recovered by the receiver 1035 is provided to a receive frame processor 1036, which parses each frame, and provides information from the frames to the channel processor 544 and the data, control, and reference signals to a receive processor 1038. The receive processor 1038 performs the inverse of the processing performed by the transmit processor 1080 in the UE 1050. The data and control signals carried by the successfully decoded frames may then be provided to a data sink 1039 and the controller/processor, respectively. If some of the frames were unsuccessfully decoded by the receive processor, the controller/processor 1040 may also use an acknowledgement (ACK) and/or negative acknowledgement (NACK) protocol to support retransmission requests for those frames.

The controller/processors 1040 and 1090 may be used to direct the operation at the Node B 1010 and the UE 1050, respectively. For example, the controller/processors 1040 and 1090 may provide various functions including timing, peripheral interfaces, voltage regulation, power management, and other control functions. The computer readable media of memories 1042 and 1092 may store data and software for the Node B 1010 and the UE 1050, respectively. A scheduler/processor 1046 at the Node B 1010 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method for wireless communication, the method comprising:
   receiving one or more radio frames or parts of a frame of a voice call on a downlink channel;
   demodulating the received one or more frames or parts of the frame;
   decoding the demodulated one or more frames or parts of the frame;
   computing one or more demodulator-based metrics;
   computing one or more decoder-based metrics;
   combining the one or more demodulator-based metrics and the one or more decoder-based metrics using a reliability function that assesses reliability of the decoded one or more frames or parts of the frame, parameters of the reliability function being adaptively adjusted during the voice call to tune the reliability function over time, the parameters of the reliability function being different from the one or more demodulator-based metrics and the one or more decoder-based metrics; and
   accepting or rejecting the decoded one or more frames or parts of the frame based on the assessment of the reliability of said frames or parts of the frame.

2. The method of claim 1, wherein the one or more radio frames or parts of the fame include one or more of a voice channel frame, a data channel frame and a control channel frame.

3. The method of claim 2, wherein the voice channel frame includes an Adaptive Multi Rate (AMR) channel frame.

4. The method of claim 2, wherein the control channel frame includes a Dedicated Control Channel (DCCH) frame.

5. The method of claim 1, wherein the demodulator-based metric includes a signal-to-noise ratio (SNR) of a Common Pilot Channel (CPICH).

6. The method of claim 1, wherein the demodulator-based metric includes one or more of a SNR of a Dedicated Physical Channel (DPCH) and a target SNR of the DPCH.

7. The method of claim 1, wherein the demodulator-based metric includes one or more of a Dedicated Physical Control Channel (DPCCH) energy and a Dedicated Physical Data Channel (DPDCH) energy.

8. The method of claim 1, wherein the decoder-based metric includes a decoder Energy Metric (EM).

9. The method of claim 1, wherein the decoder-based metric includes a Symbol Error Count (SER).

10. The method of claim 1, wherein the decoder-based metric includes a Yamamoto Quality Bit (YQBIT).

11. The method of claim 1, wherein the decoder-based metric includes one or more Viterbi Decoder (VD) path metrics, including one or more of a minimum (Mmin) path metric, maximum (Mmax) path metric, and zero-state (M0) path metric.

12. The method of claim 1, wherein the parameters are used in one or more comparisons in the reliability function.

13. The method of claim 12, wherein the one or more comparisons in the reliability function include:

$SIRE > SIRT + K1$, $SER\ of\ B < K2$, $SIRE > SIRT + K3$, and $SER\ of\ C < K4$, wherein SIRE is a Dedicated Physical Channel (DPCH) signal-to-interference-ratio estimate, SIRT is a DPCH signal-to-interference-ratio target, SER is a symbol error count, K1, K2, K3, and K4 are the parameters used in the comparisons, and B and C refer to respective transport channels of a voice radio bearer.

14. An apparatus for wireless communication, comprising:
   a receiver configured to receive one or more radio frames or parts of a frame of a voice call on a downlink channel;
   a demodulator configured to demodulate the received one or more frames or parts of the frame;
   a decoder configured to decode the demodulated one or more frames or parts of the frame;
   a demodulator metrics determiner configured to compute one or more demodulator-based metrics;
   a decoder metric determiner configured to compute one or more decoder-based metrics;
   a metrics combiner configured to combine the one or more demodulator-based metrics and the one or more decoder-based metrics using a reliability function that assesses reliability of the decoded one or more frames or parts of the frame, parameters of the reliability function being adaptively adjusted during the voice call to tune the reliability function over time, the parameters of the reliability function being different from the one or more demodulator-based metrics and the one or more decoder-based metrics; and the decoder further configured to accept or reject the decoded one or more frames or parts of the frame based on the assessment of the reliability of said frames or parts of the frame.

15. The apparatus of claim 14, wherein the one or more radio frames or parts of the fame include one or more of a voice channel frame, a data channel frame and a control channel frame.

16. The apparatus of claim 15, wherein the voice channel frame includes an Adaptive Multi Rate (AMR) channel frame.

17. The apparatus of claim 15, wherein the control channel frame includes a Dedicated Control Channel (DCCH) frame.

18. The apparatus of claim 14, wherein the one or more demodulator-based metrics include one or more of a signal-to-noise ratio (SNR) of a Common Pilot Channel (CPICH), a SNR of a Dedicated Physical Channel (DPCH), a target SNR of the DPCH, a Dedicated Physical Control Channel (DPCCH) energy, and a Dedicated Physical Data Channel (DPDCH) energy.

19. The apparatus of claim 14, wherein the one or more decoder-based metrics include one or more of a decoder Energy Metric (EM), a Symbol Error Count (SER), a Yamamoto Quality Bit (YQBIT), and one or more Viterbi Decoder (VD) path metrics, including one or more of a minimum (Mmin) path metric, maximum (Mmax) path metric, and zero-state (M0) path metric.

20. An apparatus for wireless communication, comprising:
means for receiving one or more radio frames or parts of a frame of a voice call on a downlink channel;
means for demodulating the received one or more frames or parts of the frame;
means for decoding the demodulated one or more frames or parts of the frame;
means for computing one or more demodulator-based metrics;
means for computing one or more decoder-based metrics;
means for combining the one or more demodulator-based metrics and the one or more decoder-based metrics using a reliability function that assesses reliability of the decoded one or more frames or parts of the frame, parameters of the reliability function being adaptively adjusted during the voice call to tune the reliability function over time, the parameters of the reliability function being different from the one or more demodulator-based metrics and the one or more decoder-based metrics; and
means for accepting or rejecting the decoded one or more frames or parts of the frame based on the assessment of the reliability said frames or parts of the frame.

21. The apparatus of claim 20, wherein the one or more radio frames or parts of the fame include one or more of a voice channel frame, a data channel frame and a control channel frame.

22. The apparatus of claim 21, wherein the voice channel frame includes an Adaptive Multi Rate (AMR) channel frame.

23. The apparatus of claim 21, wherein the control channel frame includes a Dedicated Control Channel (DCCH) frame.

24. The apparatus of claim 20, wherein the one or more demodulator-based metrics include one or more of a signal-to-noise ratio (SNR) of a Common Pilot Channel (CPICH), a SNR of a Dedicated Physical Channel (DPCH), a target SNR of the DPCH, a Dedicated Physical Control Channel (DPCCH) energy, and a Dedicated Physical Data Channel (DPDCH) energy.

25. The apparatus of claim 20, wherein the one or more decoder-based metrics include one or more of a decoder Energy Metric (EM), a Symbol Error Count (SER), a Yamamoto Quality Bit (YQBIT), and one or more Viterbi Decoder (VD) path metrics, including one or more of a minimum (Mmin) path metric, maximum (Mmax) path metric, and zero-state (M0) path metric.

26. A non-transitory computer-readable medium, comprising:
at least one instruction executable by a computer to receive one or more radio frames or parts of a frame of a voice call on a downlink channel;
at least one instruction executable by the computer to demodulate the received one or more frames or parts of the frame;
at least one instruction executable by the computer to decode the demodulated one or more frames or parts of the frame;
at least one instruction executable by the computer to compute one or more demodulator-based metrics;
at least one instruction executable by the computer to compute one or more decoder-based metrics;
at least one instruction executable by the computer to combine the one or more demodulator-based metrics and the one or more decoder-based metrics using a reliability function that assesses reliability of the decoded one or more frames or parts of the frame, parameters of the reliability function being adaptively adjusted during the voice call to tune the reliability function over time, the parameters of the reliability function being different from the one or more demodulator-based metrics and the one or more decoder-based metrics; and
at least one instruction executable by the computer to accept or reject the decoded one or more frames or parts of the frame based on the assessment of the reliability of said frames or parts of the frame.

27. The computer-readable medium of claim 26, wherein the one or more radio frames or parts of the fame include one or more of a voice channel frame, a data channel frame and a control channel frame.

28. The computer-readable medium of claim 27, wherein the voice channel frame includes an Adaptive Multi Rate (AMR) channel frame.

29. The computer-readable medium of claim 27, wherein the control channel frame includes a Dedicated Control Channel (DCCH) frame.

30. The computer-readable medium of claim 26, wherein the one or more demodulator-based metrics include one or more of a signal-to-noise ratio (SNR) of a Common Pilot Channel (CPICH), a SNR of a Dedicated Physical Channel (DPCH), a target SNR of the DPCH, a Dedicated Physical Control Channel (DPCCH) energy, and a Dedicated Physical Data Channel (DPDCH) energy.

31. The computer-readable medium of claim 26, wherein the one or more decoder-based metrics include one or more of a decoder Energy Metric (EM), a Symbol Error Count (SER), a Yamamoto Quality Bit (YQBIT), and one or more Viterbi Decoder (VD) path metrics, including one or more of a minimum (Mmin) path metric, maximum (Mmax) path metric, and zero-state (M0) path metric.

* * * * *